United States Patent
Ritthammer et al.

(10) Patent No.: US 10,322,733 B2
(45) Date of Patent: Jun. 18, 2019

(54) GANGWAY CONNECTION SYSTEM FOR GUIDING AT LEAST ONE POWER CABLE AND CLAMPING PART FOR SUCH A GANGWAY CONNECTION SYSTEM

(71) Applicant: LEONI KABEL GMBH, Nuremberg (DE)

(72) Inventors: Marcus Ritthammer, Georgsmuend (DE); Conny Sundberg, Penzberg (DE)

(73) Assignee: LEONI Kabel GmbH, Nuremberg (DE)

( * ) Notice: Subject to any disclaimer, the term of this patent is extended or adjusted under 35 U.S.C. 154(b) by 99 days.

(21) Appl. No.: 15/463,663

(22) Filed: Mar. 20, 2017

(65) Prior Publication Data

US 2017/0217454 A1    Aug. 3, 2017

Related U.S. Application Data

(63) Continuation of application No. PCT/EP2015/069596, filed on Aug. 27, 2015.

(30) Foreign Application Priority Data

Sep. 19, 2014 (DE) .................. 10 2014 218 944

(51) Int. Cl.
  *H02G 3/32* (2006.01)
  *B61G 5/10* (2006.01)
  (Continued)

(52) U.S. Cl.
  CPC .................. *B61G 5/10* (2013.01); *F16L 3/01* (2013.01); *F16L 3/105* (2013.01); *F16L 3/1033* (2013.01); *F16L 3/237* (2013.01); *H02G 3/04* (2013.01)

(58) Field of Classification Search
  CPC .. B61G 5/10; F16L 3/01; F16L 3/1033; F16L 3/105; F16L 3/237; H02G 3/04;
  (Continued)

(56) References Cited

U.S. PATENT DOCUMENTS

| 1,526,286 A | 2/1925 | Hornburg |
| 6,773,296 B2 | 8/2004 | Kihira et al. |
(Continued)

FOREIGN PATENT DOCUMENTS

| CN | 201423930 Y | 3/2010 |
| CN | 103889813 | 6/2014 |
(Continued)

*Primary Examiner* — Angel R Estrada
(74) *Attorney, Agent, or Firm* — Laurence A. Greenberg; Werner H. Stemer; Ralph E. Locher

(57) ABSTRACT

A gangway connection system guides at least one power cable and has a clamping part which has at least one feed through for the power cable. The feed through extends along a longitudinal axis and between an inlet opening and an outlet opening, and has a longitudinal-section profile with an inner and an outer longitudinal-section contour. At least one of the longitudinal-section contours is curved at least regionally. Alternatively or in addition, the gangway connection system is characterized in that the power cable extends helically in a cable longitudinal direction and the clamping part has an outer face directed in the cable longitudinal direction. The clamping part has at least one abutment surface for the power cable. The abutment surface extends in an inclined manner with respect to the cable longitudinal direction.

14 Claims, 5 Drawing Sheets

(51) Int. Cl.
  *F16L 3/01* (2006.01)
  *F16L 3/10* (2006.01)
  *F16L 3/237* (2006.01)
  *H02G 3/04* (2006.01)

(58) Field of Classification Search
  CPC .......... H02G 3/00; H02G 3/0406; H02G 3/02;
        H02G 3/32; H02G 7/00; H02G 7/08
  USPC ............... 174/40 CC, 68.1, 72 A, 135, 74 R;
        248/68.1, 49
  See application file for complete search history.

(56) References Cited

U.S. PATENT DOCUMENTS

| | | | | |
|---|---|---|---|---|
| 8,172,601 | B2* | 5/2012 | Adachi | H02G 3/0437 |
| | | | | 385/60 |
| 8,178,795 | B2* | 5/2012 | Roy | H02G 3/185 |
| | | | | 174/151 |
| 8,590,847 | B2* | 11/2013 | Guthke | H02G 3/32 |
| | | | | 174/68.1 |
| 9,124,020 | B2 | 9/2015 | Kameda et al. | |
| 9,771,089 | B2* | 9/2017 | Ritthammer | H02G 3/02 |
| 2005/0211127 | A1 | 9/2005 | Ohashi et al. | |
| 2010/0326942 | A1 | 12/2010 | Dahlstrom et al. | |
| 2014/0273612 | A1 | 9/2014 | Kameda et al. | |

FOREIGN PATENT DOCUMENTS

| | | |
|---|---|---|
| DE | 682495 C | 10/1939 |
| DE | 19614427 A1 | 10/1997 |
| DE | 19705895 A1 | 8/1998 |
| DE | 102006034303 A1 | 8/2007 |
| FR | 2713183 A1 | 6/1995 |
| GB | 2482058 A | 1/2012 |
| JP | H08108848 A | 4/1996 |
| JP | 2004067072 A | 3/2004 |
| JP | 2010519100 A | 6/2010 |
| JP | 4562161 B2 | 10/2010 |
| JP | 2012144230 A | 8/2012 |
| WO | 2007085417 A1 | 8/2007 |
| WO | 2013057794 A1 | 4/2013 |

* cited by examiner

GANGWAY CONNECTION SYSTEM FOR GUIDING AT LEAST ONE POWER CABLE AND CLAMPING PART FOR SUCH A GANGWAY CONNECTION SYSTEM

CROSS-REFERENCE TO RELATED APPLICATION

This is a continuation application, under 35 U.S.C. § 120, of copending international application No. PCT/EP2015/069596, filed Aug. 27, 2015, which designated the United States; this application also claims the priority, under 35 U.S.C. § 119, of German patent application No. 10 2014 218 944.6, filed Sep. 19, 2014; the prior applications are herewith incorporated by reference in their entirety.

BACKGROUND OF THE INVENTION

Field of the Invention

The invention relates to a gangway connection system for guiding at least one power cable, having a clamping part which contains at least one feed through for the power cable. In addition, the invention relates to a clamping part in particular for such a gangway connection system.

Such a gangway connection system is described, for example, in published, non-prosecuted German patent application DE 10 2006 034 303 A1.

In particular in the rail sector, so-called gangway connection systems, which guide the power cable from one car to another, are used to convey power cables between two cars of a train. The power cable, in this connection, is, for example, a cable for power transmission, in particular in the kilovolt range, or a data or signal cable. The power cable is then connected electrically to a suitable connection point via each of the ends thereof. In this case, it is also possible for several power cables to be guided by a gangway connection system.

A gangway connection system additionally also provides a flexible connection in such a manner that a relative movement between the two cars with respect to one another is made possible. In this case, in order to avoid putting the connection points of the power cable under disadvantageous mechanical stress, clamping parts, with a number of feed throughs in which the power cable is clamped and which absorb a possible application of force, are used in particular for mechanical fixing. In this connection, however, it is possible for the power cable, under corresponding stress, to be pressed against edges of the clamping part and in this way to experience intermittent stress which, in particular in the case of repeated occurrence, possibly results in abrasion on the sheath of the power cable or even in damage to the power cable.

Chinese patent CN 2014 239 30 shows, for example, a gangway connection system where two spiral cables are held by means of a clamping part, the clamping part including two substantially cuboid jaws, in which the spiral cables are clamped. In this case, the spiral cables are crimped between the two jaws in such a manner that a gap is realized between the jaws.

Published, non-prosecuted German patent application DE 10 2006 034 303 A1 describes, for example, a device for guiding power cables in the case of a gangway connection system where several power cables are guided individually through cable feed throughs in one clamping block. In addition, in this connection, the clamping block is realized as a plastic material injection molded part, as a result of which it is possible in a simple manner to adapt the diameter of a respective cable feed through to the diameter of the power cable in order to obtain as optimum a clamping action as possible. In order, nevertheless, to allow for a bending movement in the transverse direction of the power cable, in a further development the clamping block contains a conical cable feed through.

Published, non-prosecuted German patent application DE 196 14 427 A1 describes a coupling connector. In the case of the coupling connector, the ends of the spiral cables are connected to a support plate. To this end, the cable ends are fixed on the support plate by way of a cable terminal such that the respectively end-side spiral coil of a cable abuts against the support plate. In addition, the cables are also connected electrically to the support plate in this way. The support plates are aligned perpendicularly to the longitudinal direction, that is to say roughly approximately parallel to the spiral coils of the cables and the cable ends abut flatly against the respective support plate.

SUMMARY OF THE INVENTION

The object underlying the invention is to provide an improved device for guiding a power cable in the case of a gangway connection system in such a manner that subjecting the power cable to in particular intermittent, mechanical stress is prevented or at least reduced. In addition, a clamping part which is suitable for such a device is to be provided.

The object is achieved according to the invention by a device with the features of the main claim. Advantageous designs, further developments and variants are the object of the sub claims.

The gangway connection system is configured for guiding at least one power cable, for example between two cars of a train. The gangway connection system includes a clamping part which contains at least one feed through for the power cable. The feed through extends along a longitudinal axis and between an inlet opening and an outlet opening. In addition, the feed through contains a longitudinal sectional profile, having an inner and an outer longitudinal sectional contour, wherein at least one of the longitudinal sectional contours is curved at least in regions.

The advantages obtained with the invention consist, in particular, in that in operation or when the power cable moves, intermittent mechanical stress is avoided or at least reduced. In particular, as a result of the longitudinal sectional contour of the feed through being curved at least in portions, a bending movement of the power cable suitable for this purpose is made possible, with the power cable being at the same time fixed in the clamping block. When the power cable moves in particular perpendicularly to the longitudinal axis, the curved longitudinal sectional contour advantageously enlarges the size of the contact surface of the power cable with the clamping part such that corresponding mechanical stress is distributed to a larger surface. As a result, in particular the pressing force per unit area with reference to the power cable is also reduced, as a result of which, in turn, the abrasion on said power cable, in particular on the sheath thereof, is reduced.

In published, non-prosecuted German patent application DE 196 14 427 the cable terminal serves at the same time for electrically contacting the power cables. In contrast, a substantial advantage of the present invention consists precisely in that electrical and mechanical connections are decoupled and separated spatially from one another. The clamping part serves exclusively for holding the power cable mechanically, an electric connection is effected at a separate connection point and not at the clamping part. As a result, it is possible, in particular, in the event of several power cables, to connect the cables to different connection points, but to hold them together in a particularly space-saving manner by means of the clamping part.

On account of the spatial separation of the holding point and connecting point of the power cable, it is additionally possible to select the respective parts and materials of the gangway connection system in an expedient manner depending on the requirement, i.e. to design in particular the clamping part optimally with regard to the object thereof, namely mechanically holding the power cable. Advantageously, electrical characteristics, namely, do not play a part in this connection. The clamping part is then preferably produced from an in particular mechanically robust plastics material, for example as a cost-efficient injection molded part. Correspondingly, it does not need to satisfy any particular electrical demands as the clamping part is not connected electrically to the power cable. Rather, the power cable contains a cable sheath produced from an insulating material which comes into contact with the clamping part inside the feed through. The material of the clamping part is then selected in an expedient manner with consideration to the material of the cable sheath in order to ensure, for example, particularly good or specifically defined static friction.

The power cable is, in particular, a cable for power transmission and is configured correspondingly as a high-voltage cable or high-current cable. In particular, the power cable is realized as a spiral cable or roof spiral which extends helically or spirally about a cable longitudinal axis, that is to say extends in windings around the cable longitudinal axis. In a variant, however, the power cable is not formed in a helical manner, but, for example, is realized in a straight or curved manner. The power cable is connected by way of one end to a suitable electrical connection, for example by a cable shoe fastened on the end of the power cable, and runs initially into the inlet opening, traverses the feed through and exits out of the clamping part again via the outlet opening. The inlet opening and the outlet opening are each also designated in general as opening.

The feed through includes an inner wall, the progression of which in the direction of the longitudinal axis is adapted in a particular manner such that improved guiding and holding of the power cable is obtained. In longitudinal section, that is to say in a longitudinal sectional plane parallel to the longitudinal axis of the feed through, a longitudinal sectional profile, which is characterized by two longitudinal sectional contours, is produced in this manner. In this case, the longitudinal axis extends, in particular at least in part, in a curved manner in the longitudinal sectional plane and provides, in particular, a center line of the two longitudinal sectional contours. The longitudinal sectional plane is then, in particular, a symmetry plane in such a manner that the feed through is mirror-symmetrical with reference to said longitudinal sectional plane.

In longitudinal section, the longitudinal sectional contours border the interior of the feed through. In this case, the longitudinal sectional contours are not necessarily realized in a similar manner, that is to say do not necessarily comprise the same progression. In addition, the feed through is introduced in such a manner into the clamping part that it is arranged in an offset manner with reference to a center point of the clamping part. The longitudinal sectional contour which extends closer with reference to the center point is then an inner longitudinal sectional contour, the longitudinal sectional contour which is located further outside is correspondingly an outer longitudinal sectional contour.

The interior of the feed through is, in particular, completely surrounded by the clamping part except for the inlet opening and the outlet opening. In other words: the feed through is realized in a tube-shaped or pipe-shaped manner in the clamping part and comprises a continuous wall. The power cable is consequently entirely surrounded by the clamping part and is consequently held in an equally optimum manner transversely with respect to the longitudinal direction in all directions.

At least one of the two longitudinal sectional contours of the longitudinal sectional profile is realized in a curved manner at least in portions, that is to say it extends, at least in portions, in a curved manner in the longitudinal sectional plane. As a result, on the one hand it is possible to guide a spiral cable in a particularly suitable manner through the feed through. As an alternative to this or in addition to it, on the other hand it is possible to provide suitable space for movement for the power cable in operation. In order to avoid subjecting the power cable, in particular, to intermittent mechanical stress in the feed through, the at least one longitudinal sectional contour, in particular both longitudinal sectional contours is/are realized completely free of edges. In this case, free of edges is to be understood here and below, in particular, as a curved portion containing radius of curvature of at least 1 mm, preferably 2 mm. The longitudinal sectional contour possibly also contains straight portions, the transition from a straight to a curved portion also being realized in a rounded manner. When realizing the clamping part, edges are generally preferably dispensed with in those regions with which the power cable possibly comes into contact.

In order to avoid, in particular, subjecting the power cable to intermittent stress at the openings, they each preferably contain rounded edges. The rounded edges, in this case, are in particular not part of the longitudinal sectional contours. A suitable radius of curvature for the rounded edges is at least 1 mm and no more than 50 mm, preferably no more than 10 mm. In a preferred manner, the radius of curvature is approximately 2 mm.

Two feed throughs with different longitudinal sectional profiles are preferably realized for the at least one power cable, namely a first and a second feed through. The holding action of the clamping part is further improved in this way. On account of the first and the second feed through being realized differently, possible mechanical stress is additionally distributed in a particularly suitable manner to various portions of the power cable as well as also to different regions of the clamping part. The two feed throughs are then traversed by the power cable one after another, the cable in each case, when viewed from the end thereof, initially entering into the respective feed through by the respective inlet opening and exiting again by the associated outlet opening.

In a preferred design, the at least one longitudinal sectional contour contains, at least in portions, a radius of curvature which corresponds to a radius of curvature of the power cable. In other words: the radius of curvature of the longitudinal sectional contour is adapted in portions to the radius of curvature of the power cable. On account of the thickness, that is to say a certain diameter of the power cable, the cable contains, in particular, an inner and an outer radius of curvature. In the case of the inner longitudinal sectional contour, the radius of curvature thereof then corresponds in portions to the inner radius of curvature, in the case of the outer longitudinal sectional contour, it is correspondingly the outer radius of curvature. As a result, a particularly suitably, that is to say here, in particular, appropriately formed feed through is realized for guiding a spiral cable, generally a curved power cable.

A radius of curvature of the power cable is to be understood, in this case, in particular, as the radius of curvature which the power cable contains in the mechanically non-stressed state, that is to say at a point in time at which the power cable does not experience any mechanical force and, in particular, contains the curvature realized at its production. The longitudinal sectional contour, in the event of a curved inner longitudinal sectional contour, is then realized in a convex manner, therefore abuts against the inside of a winding of the power cable, that is to say on the side facing the cable longitudinal axis; in the event of a curved outer longitudinal sectional contour, it is correspondingly convex and abuts against the outside of the winding.

As an alternative to this or in addition to it, the at least one longitudinal sectional contour contains, in a suitable variant, at least in portions, a radius of curvature which corresponds to a predefined minimum radius of curvature of the power cable or enables a progression of the power cable at the minimum radius of curvature. In this way, a particularly suitable space for moving is provided for the power cable. In this case, the minimum radius of curvature corresponds to a minimum radius of curvature predefined corresponding to the design of the power cable. In the case of a corresponding movement of the power cable in operation, the longitudinal sectional contour ensures that, on the one hand, the minimum radius of curvature is held at least in the feed through as well as, on the other hand, that in the case the power cable abuts optimally against the inner wall of the feed through and a corresponding application of force is distributed over a large area.

In order to enable the power cable to curve to the minimum radius of curvature, in one embodiment the radius of curvature is reduced on the corresponding portion of the longitudinal sectional contour compared to the radius of curvature of the power cable in the mechanically non-stressed state. A comparable effect, however, is also achievable with a larger radius of curvature of the longitudinal sectional contour by the radius, in an alternative embodiment, proceeding from a center point which is offset compared to a center point of the radius of curvature of the power cable, in particular in the radial direction with reference to the cable longitudinal axis. In this case, it is in particular possible for the longitudinal sectional contour to contain the same radius of curvature as the non-stressed power cable, but on account of the offset a suitable space is realized in the feed through which enables a stronger curvature, that is to say a reduction in the radius of curvature of the power cable where there is stress during operation.

In an advantageous design, both longitudinal sectional contours are curved in the same direction on a first portion and in opposite directions on a second portion. A feed through formed in this manner is particularly suitable for a power cable which extends in a curved manner inside the feed through, for example a spiral cable. The power cable is then held, in particular, in the first portion, while in the second portion, on account of the opposite curvature, an extended space for moving is created for the power cable. In other words: one of the longitudinal sectional contours is realized in an S-shaped manner, the other is approximately C-shaped, as a result of which, on the one hand, the first portion is realized with similarly extending longitudinal sectional contours and the second portion with diverging longitudinal sectional contours. In particular, in the case of a spiral cable, the inner longitudinal sectional contour is expediently realized in a C-shaped manner and the outer longitudinal sectional contour in an S-shaped manner.

To fix the power cable in the feed through, the feed through advantageously contains a holding portion and on the holding portion a diameter which corresponds substantially to the diameter of the power cable. In other words: the clearance of the feed through along the holding portion is adapted to the outer dimension of the power cable. Substantially is to be understood, in particular, as the diameter of the holding portion corresponding at most to the diameter of the power cable, which means it is at least form fitting, as well as being at most 10% smaller than the diameter of the power cable. In a preferred manner, the diameter of the holding portion is between 5% and 8% smaller than the diameter of the power cable. As a result, a suitable clamping action is generated in such a manner that the power cable is fixed on the inner wall in the feed through on account of friction, but is not crimped such that the conductor guided in the sheath of the power cable is able to slide or slip. For example, the power cable contains a diameter of approximately 21.5 mm and the holding portion contains a diameter of approximately 20.4 mm. The holding portion corresponds in particular to the above-mentioned first portion.

In a preferred design, the holding portion is realized in the manner of a curved cylinder. As a result of the cylindrical realization, the power cable is held in an advantageously form-fitting manner in the holding portion and, in this case, is not crimped. This latter is, in particular, frequently the case with previously known clamping parts, which are assembled from two half shells which are pressed together by screws and in which the power cable is then crimped. In this case, the half shells can be additionally screw-connected in a defined manner such that no clamping force required for fixing the power cable, which possibly results in wear on the clamping part, has to be generated, but simply a connection between the half shells together has to be obtained. The realization of a gap in particular between the two half shells, which otherwise possibly allows the power cable to move sideways in an unwanted manner, is also avoided as a result of the defined screw connection. This means that the half shells abut against one another and just the feed through realizes a cavity between the half shells. The half shells are consequently connected together advantageously in a gap-free manner.

As a result of the feed through being configured to the diameter of the power cable, the cable is simply held by a form fit; when the cable is subjected to mechanical stress, in particular when bending, a fixing frictional effect occurs. The advantage of this, in particular, is that the conductor or the stranded wire in the power cable remains movable relative to the sheath. In addition, possible torsion is distributed in the entire cable, which is also in the portion of the power cable which sits in the clamping block. In other words: the corresponding mechanical stress is distributed advantageously over the entire power cable.

In an expedient further development, the holding portion extends over at least a quarter of the length of the feed through and no more than over half the length, in a preferred manner approximately over a third thereof. In this case, the length of the feed through is to be understood as, in particular, the length of the longitudinal axis between the inlet opening and the outlet opening. The correspondingly chosen length enables the power cable to be held in a particularly suitable manner in the feed through, with the simultaneous possibility of providing a space for moving along the remaining length of the feed through.

As an alternative to or in addition to the holding portion, an outlet portion, which is realized in the manner of a funnel, connects expediently to the outlet opening. For this purpose, on the outlet portion, the feed through contains a diameter which increases in the direction of the outlet opening. A particularly suitable space for moving is created for the power cable in operation in this way. This is delimited, in particular, by the inner wall which is formed by the funnel. The delimitation is preferably effected, in this case, in such a manner that the radius of curvature of the longitudinal sectional contours corresponds to the minimum radius of curvature of the power cable. The outlet portion corresponds, in particular, to the above-mentioned second portion.

In an expedient further development, the feed through contains a circular cross section consistently on the outlet portion, the cross section extending transversely, that is to say in particular perpendicularly to the longitudinal axis of the feed through. In other words: the outlet portion is realized in a rotationally symmetrical manner to the longitudinal axis. In this way, a suitable bending space is created perpendicular to the longitudinal axis in all directions. The diameter corresponds, in particular, to the distance between the two longitudinal contours on the outlet portion.

In particular when a spiral cable is held by two feed throughs, the first feed through is realized completely as a curved cylinder which extends between the two corresponding openings. In particular, the first feed through is realized completely as a holding portion. The second feed through, in contrast, is preferably realized as a combination of a funnel and of a curved cylinder, the cylinder then forming, in particular, a holding portion and the feed through containing overall a trumpet shape. The longitudinal sectional contours of the first feed through are then each curved in a C-shaped manner and in the same direction. Proceeding from the connection, the power cable then initially traverses the cylindrical, first feed through and then the trumpet-shaped, second feed through. As a result of the design, the power cable is primarily fixed in the first feed through, while in the second feed through it is only held in portions and a controlled space for moving for the power cable is otherwise provided by the funnel-shaped outlet portion.

A gangway connection system is consequently realized, in particular, corresponding to one of the above-mentioned designs and includes a clamping part which contains at least one feed through for the power cable. In this case, the power cable is wound here, in particular in a helical manner, and extends in a cable longitudinal direction. Wound is to be understood, in particular, as the power cable containing at least one winding which is guided past the clamping part. The clamping part additionally contains an outer surface which points in the cable longitudinal direction, also designated as an end face, having at least one abutment surface for the power cable which extends at an angle with respect to the cable longitudinal direction, that is to say is set with reference to the cable longitudinal direction. Particularly in the case of helical or generally wound power cables, it is possible for a portion of the power cable to be pressed onto the clamping part in operation. In particular in the case of cuboid clamping parts, the power cable then comes into contact with an edge, in particular outside edge, in such a manner that disadvantageous, intermittent stress is exerted on the power cable. As a result of the abutment surface, the outer surface is then realized overall in such a manner that it provides, in the region of the abutment surface, for the power cable possibly pressed thereon, a support or contact surface instead of an edge. Other possible edges which border the abutment surface are realized expediently in a rounded manner. In this case, such an edge, which at the same time also borders the outer surface, is designated as an outside edge, and an edge which extends on the outer surface and provides in particular the transition to an abutment surface, is designated as an inside edge. The edges preferably have a radius of curvature of at least 1 mm and no more than 50 mm, in particular the outside edge being realized similarly to the above-described edges of the openings and expediently containing a smaller radius of curvature than the inside edge.

For realizing a particularly suitable abutment surface, this is preferably inclined or set at a defined angle which corresponds approximately to the pitch of the winding of the power cable. In order to provide a suitable abutment surface in particular in the case of a power cable for power transmission, the abutment surface is inclined at an angle of at least 65° and no more than 85° with reference to the cable longitudinal direction.

In addition, the clamping part contains a height, in particular in the direction of the longitudinal axis of the feed through and perpendicular to the cable longitudinal direction. In an expedient design, the abutment surface extends over at least 15% of the height and over no more than 50%. A suitably large abutment surface is provided in this manner.

The outer surface preferably contains two abutment surfaces which are set in opposing directions. In this way, it is then possible, in particular, to provide a winding of the power cable on both sides of the outer surface of an abutment surface. Also in the case of guiding several power cables, the realization with two abutment surfaces is additionally advantageous to the effect that two different power cables possibly emerge on different sides of the clamping part and in the case intermittent stress as a result of edges potentially occurs on both sides. As a result of the realization with two abutment surfaces, however, this is advantageously avoided.

The object is additionally achieved by a clamping part with the features of claim 15. The further developments and advantages named in conjunction with the gangway connection system also apply analogously to the clamping part.

The clamping part is used in a preferred manner in the railway sector. In principle, it can generally also be used for guiding a power cable between two units which are movable relative to one another, for example in the case of robot systems or other production machines where two parts, which are movable with respect to one another, are connected together by a power cable.

Other features which are considered as characteristic for the invention are set forth in the appended claims.

Although the invention is illustrated and described herein as embodied in a gangway connection system for guiding at least one power cable and a clamping part for such a gangway connection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Figure 1:
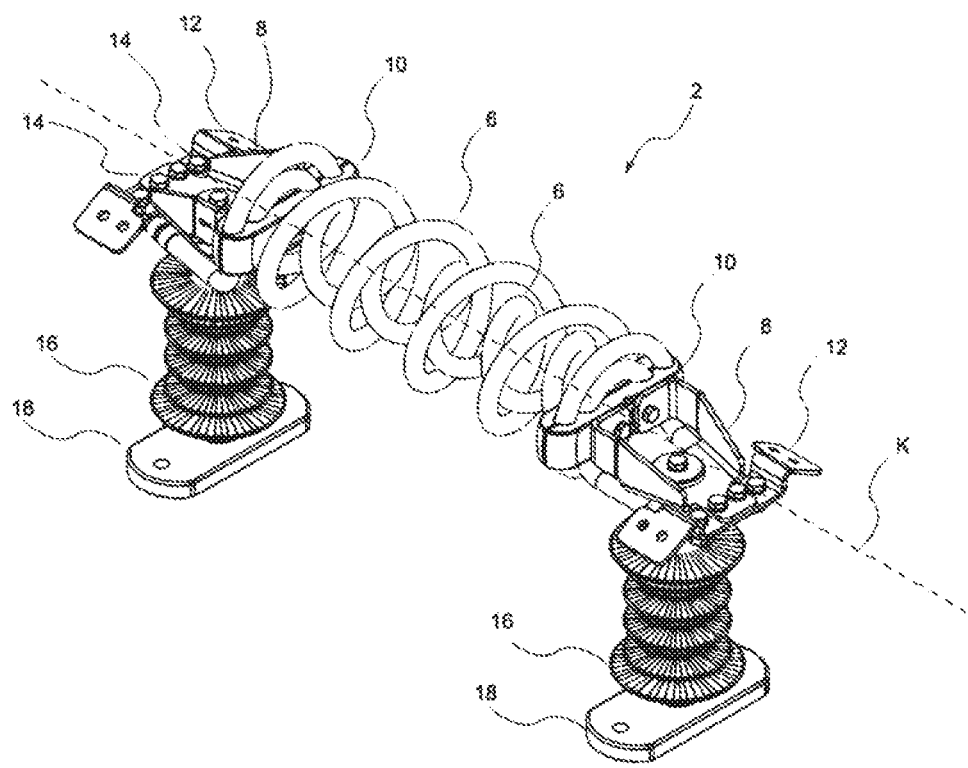
FIG. 1 is a diagrammatic, perspective view of a gangway connection system according to the invention.

Referring now to the figures of the drawings in detail and first, particularly to FIG. 1 thereof, there is shown an oblique view of an exemplary embodiment of a gangway connection system 2 for guiding at least one power cable 6, here in particular two power cables 6. In the variant shown, the gangway connection system 2 includes two supporting parts 8 on each of which a clamping part 10 is fastened. The clamping parts 10 serve, in particular, for holding the power cable 6 and are here screwed to the respective supporting part 8 by a screw connection. The clamping parts 10 are produced from metal here, the supporting parts 8 from sheet metal. In addition, an electric terminal bus 12, to which the ends of the power cables 6 are each connected at connection points 14 so as to be electrically conducting, is fastened on each of the supporting parts 8. In order to connect the supporting parts 8 in each case to a car of a train (not shown here in any detail), each of the supporting parts 8 is attached in each case on an insulator 16 which is fastenable, in turn, on the car by a respective base plate 18.

The power cables 6 shown in FIG. 1 are realized as spiral cables, also designated as heliax cables, and extend here in a helical manner around a common cable longitudinal axis K. In this case, the power cables 6 extend here concentrically with respect to one another, that is to say the one power cable 6 is arranged inside the other power cable 6; in addition, the power cables 6 extend in opposite directions of rotation to one another.

Figure 2:
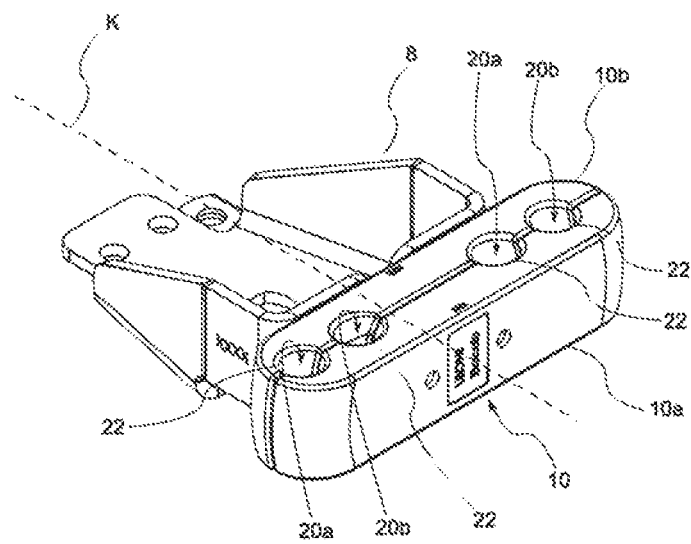
FIG. 2 is a perspective view of a supporting part with a clamping part fastened thereon.

FIG. 2 shows part of the gangway connection system 2 from FIG. 1, namely one of the supporting parts 8 with a clamping part 10 fastened thereon. The latter is in particular composed of two half shells 10a, 10b. In this case, the half shell 10a pointing away from the supporting part 8 is also designated as front half shell 10a and the half shell 10b which is directly in contact with the supporting part 8 is designated as rear half shell 10b.

The supporting part 8 serves in FIG. 2 in particular also as an angle in such a manner that the mounting directions of the clamping part 10 and of the insulator 16 (not shown here) are at a predetermined angle, here 90°, with respect to one another.

In the exemplary embodiment shown here, two feed throughs 20a, 20b in each case are inserted into the clamping part 10 for each of the two power cables 6. In particular, in this case, the feed through pair 20a, 20b which is inside with reference to the cable longitudinal axis K serves for holding the inside power cable 6 and the outside feed through pair 20a, 20b serves for holding the outside power cable 6. The feed throughs 20a, 20b, in this case, are accessible via openings 22 which are realized in a corresponding manner on the top surface and the bottom surface (which is not visible here) of the clamping part 10. In order to reduce intermittent stress on the power cables 6 when they are moving, the openings 22 are realized here in each case with rounded edges; the radius of curvature here is approximately 2 mm.

Figure 3:
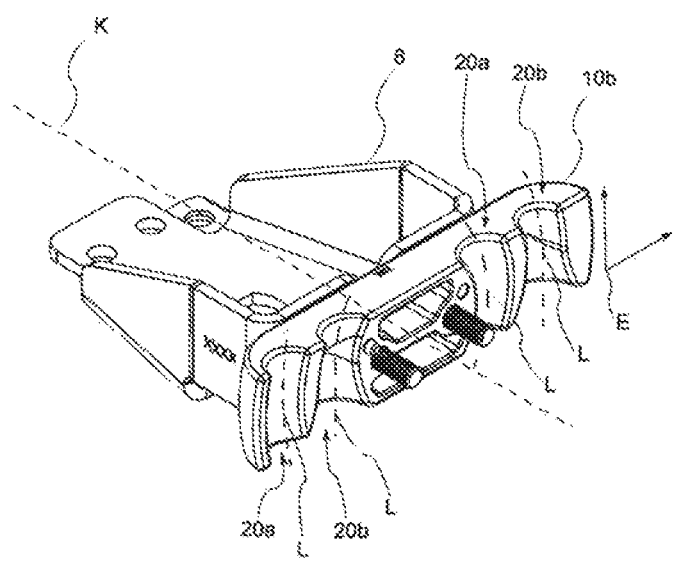
FIG. 3 is a perspective view of the arrangement according to FIG. 2 with just one half shell of the clamping part.

FIG. 3 shows the arrangement shown in FIG. 2 without the front half shell 10a. The feed throughs 20a, 20b and the inner walls thereof can be seen clearly here. The partition plane, which is formed on account of the realization of the half shells 10a, 10b, at the same time provides a longitudinal sectional plane E of the feed throughs 20a, 20b. The longitudinal sectional plane E is illustrated in FIG. 3 by a pair of arrows. The feed throughs 20a, 20b extend along longitudinal axes L, which are curved at least in portions and in each case extend in the longitudinal sectional plane E. Accordingly, the feed throughs 20a, 20b generally follow a bent or curved progression. The longitudinal sectional plane E is additionally characterized, in particular, in that each of the feed throughs 20a, 20b is mirror-symmetrical to the longitudinal sectional plane. The front half shell 10a (not shown) consequently includes correspondingly mirror-inverted recesses for realizing the feed throughs 20a, 20b.

Figure 4A:
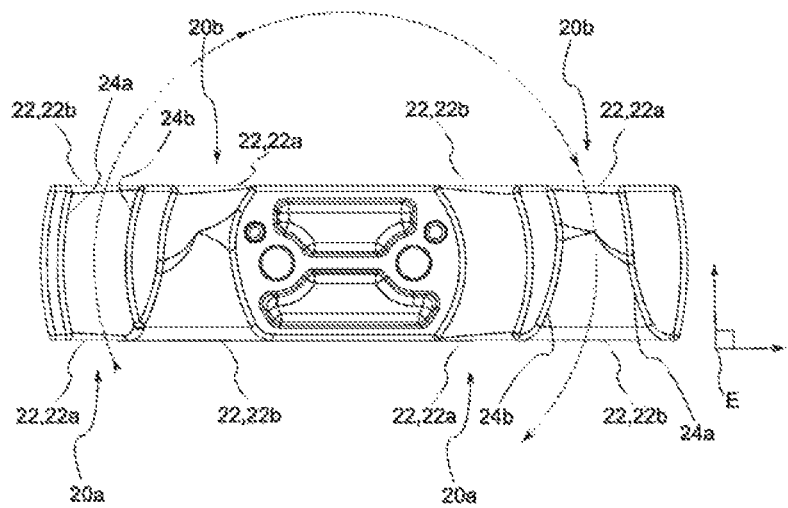
FIGS. 4A, 4B are longitudinal sectional views of the half shell shown in FIG. 3.
Figure 4B:
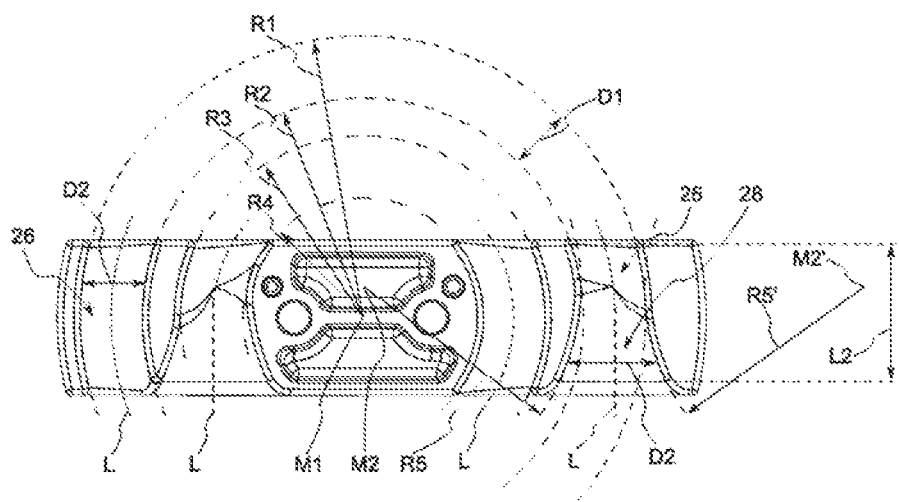

FIGS. 4A and 4B each show a front view of the clamping part 10b, that is to say a longitudinal sectional view of the clamping part 10, the sectional plane corresponding to the longitudinal sectional plane E from FIG. 3. The feed throughs 20a, 20b are also shown accordingly in longitudinal section and each contains two longitudinal sectional contours 24a, 24b which together form a longitudinal sectional profile. In this case, the longitudinal sectional contour 24a which, in each case, is inside with reference to the clamping part 10, is also designated as inside longitudinal sectional contour 24a and the longitudinal sectional contour 24b of a respective feed through 20a, 20b which, in each case, is outside, is designated as outside longitudinal sectional contour 24b.

The progression of the outside power cable 6 (not shown here) is indicated in FIG. 4A by a dotted line. Proceeding from the connection point 14 (not shown either), the power cable 6 initially traverses the first feed through 20a from bottom to top and after half a winding passes from above into the second feed through 20b, which it then leaves on the bottom surface of the clamping part 10. Consequently, the opening 22 of the first feed through 20a arranged on the bottom surface of the clamping part 10 is also designated as inlet opening 22a, just as the opening 22 of the second feed through 20b lying on the top surface of the clamping part 10. In an analogous manner to this, the openings 22 of the feed through 20a, 20b, out of which the power cable 6 emerges, are designated as outlet openings 22b.

FIG. 4B illustrates the respective progression of the feed throughs 20a, 20b and of the longitudinal sectional contours 24a, 24b thereof. The first feed through 20a, shown here on the left, is designed in the manner of a curved cylinder. The longitudinal sectional contours 24a, 24b are curved in the same direction for this purpose and each comprises an approximately C-shaped progression. The second feed through 20b, shown on the right, is realized, in contrast, in the manner of a trumpet, a holding portion 26, which is formed in the manner of a curved cylinder and is followed, in turn, by a funnel-shaped outlet portion 28, connecting to the inlet opening 22a. In this case, the feed through 20b contains a length L2 and the holding portion 26 extends, in the exemplary embodiment shown here, from the inlet opening 22a over approximately a third of the length L2 of the feed through 20b. The feed through 20a is realized here, in contrast, completely as holding portion 26.

The longitudinal sectional contours 24a, 24b of the first feed through 20a are in each case formed in a C-shaped manner and are curved in the same direction. Consequently, the feed through 20a corresponds to a curved cylinder. In this case, the respective radius of curvature R1, R2 of the outer or rather inner longitudinal sectional contour 24a, 24b is constant along the same. Furthermore, the two radii of curvature R1, R2 are also radii of concentric circles with a center point M1 which, in the variant shown here, is also at the same time a center point M1 of the clamping part 10. The longitudinal sectional profile of the feed through 20a is consequently a ring portion. The design corresponds, in particular, to the progression of the wound power cable 6 and serves correspondingly for the fixing thereof. The ring defined by the radii R1, R2 consequently also shows here, in particular, the contour of the power cable 6 not shown. The radii R1, R2 then provide an outer or rather inner radius of curvature of the power cable. The longitudinal axis L of the first feed through 20a is then curved correspondingly at the nominal or also mean radius of curvature of the power cable 6.

On the holding portion 26 which connects to the inlet opening 22a, the longitudinal sectional contours 24a, 24b of the second feed through initially follow the circles defined by the radii of curvature R1, R2. The holding portion 26 is consequently also realized in the manner of a curved cylinder. As the feed through 20b develops, the holding portion 26 merges into the outlet portion 28 on which the two longitudinal sectional contours 24a, 24b are now curved in opposite directions. In the exemplary embodiment shown here, the longitudinal sectional contours 24a, 24b comprise identical radii of curvature R5, R5', which, in a variant not shown here, however, is different for the two longitudinal sectional contours 24a, 24b. The center point M2 of the circle defined by the radius R5 is not equal to the center point M1 of the concentric circles determined by the radii R1, R2, R3, R4, but is arranged offset thereto. The corresponding center point M2' with reference to the radius R5' is mirror-inverted with respect to the center point M2 with reference to the straight portion of the longitudinal axis L of the second feed through 20b. In this way, the longitudinal sectional contours 24a, 24b on the outlet portion 28 are offset with reference to the power cable 6, as a result of which a corresponding space for moving is created in the feed through 20b. In particular, a minimum radius of curvature of the power cable 6 is determined by the radius R2 in such a manner that it assumes the corresponding minimum radius of curvature when abutting against the longitudinal sectional contour 24a of the feed through 20b. In an alternative to this which is not shown here, a similar effect is obtained as a result of the radius R5 being smaller than the radius R2 and the center point M2 not being offset with reference to the center point M1 in FIG. 4B in the vertical direction but simply or additionally in the horizontal direction.

In particular, on account of the offset of the center point M2, the radius R2 does not forcibly have to comprise a smaller value than the minimum radius of curvature of the power cable 6. It is sufficient in this connection simply for the feed through 20b, on account of the progression of the two longitudinal sectional contours 24a, 24b on the outlet portion 28, to comprise a diameter D1 which increases in the direction of the outlet opening 22b and is correspondingly larger than the diameter D2 of the power cable 6. The inner longitudinal sectional contour 24a of the feed through 20b is consequently realized in a consistently convex manner and contains an approximately C-shaped progression, while the outer longitudinal sectional contour 24b contains an approximately S-shaped progression.

Figure 5:
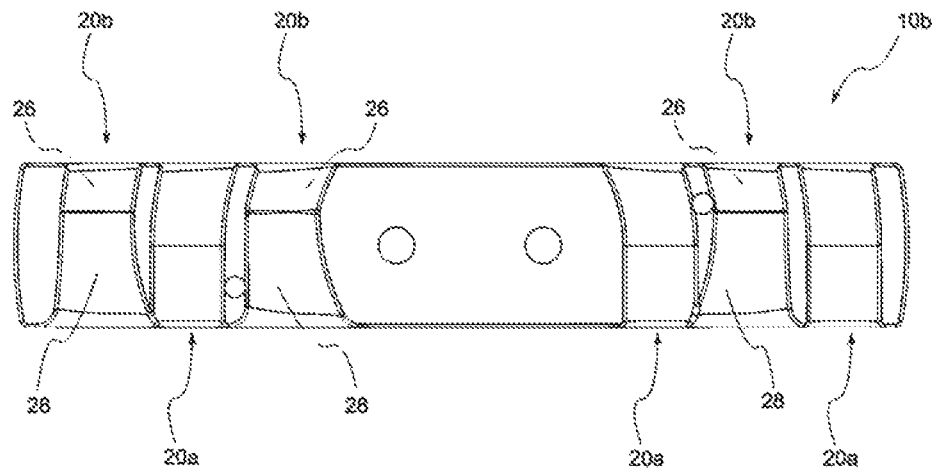
FIG. 5 is a longitudinal sectional view of an alternative half shell.
Figure 6:
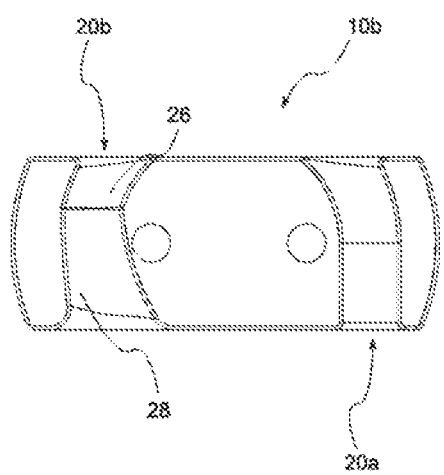
FIG. 6 is a longitudinal sectional view of a further alternative half shell.

FIGS. 5 and 6 show in each case a longitudinal sectional view of an alternative embodiment of the rear half shell 10b of the clamping part 10. The front half shell 10a which is not shown here in each case is realized in a correspondingly complementary manner hereto. The variant shown in FIG. 5 is configured for holding three power cables 6. The clamping part 10 correspondingly contains three pairs of feed throughs 20a, 20b. FIG. 6 shows correspondingly a variant of the clamping part 10 for guiding just one power cable 6 by one single pair of feed throughs 20a, 20b.

Figure 7:
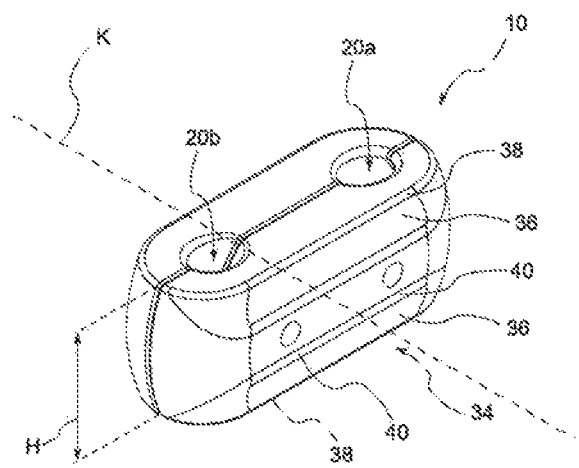
FIG. 7 is a perspective view of an alternative clamping part.
Figure 8:
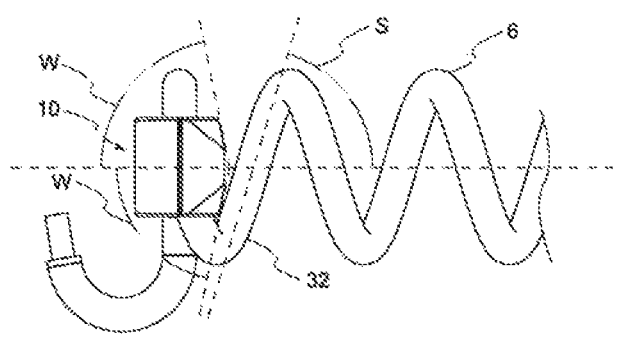
FIG. 8 is a side view of the clamping part according to FIG. 7 with a power cable held therein.

FIG. 7 shows an oblique view of a clamping part 10, for holding a power cable 6 (not shown here) which is, in particular, a spiral cable. FIG. 8 shows a side view of the clamping part 10 from FIG. 7 with a power cable 6 held therein. For guiding a winding 32 of the power cable 6 past in a suitable manner, the outer surface 34 of the front half shell 10a of the clamping part 10 is provided with two abutment surfaces 36. As FIG. 8 clearly shows, the abutment surfaces 36 are in each case set at an angle W with reference to the cable longitudinal axis K. In the exemplary embodiment shown here this is approximately 85°. It can clearly also be seen that the winding 32 of the power cable 6 which is guided past the front half shell 10a is set at a pitch S which roughly corresponds to the angle W at which the abutment surface 36 is inclined. In the event of the power cable 6 being compressed along the cable longitudinal axis K or possibly also in the case of a bend, the winding 32, in particular, is pressed in the direction of the outer surface 34. In the exemplary embodiment shown here, the bottom abutment surface 36 then forms a suitably large support for the power cable 6 and intermittent stress is avoided. In addition, the abutment surfaces 36 are also realized here with rounded edges 38, 40, wherein in the variant shown in FIGS. 7 and 8 the radius of curvature of the outside edges 38, that is to say the upper and the lower edge are realized with a radius of curvature of approximately 2 mm and the inside edges 40 with a radius of curvature of approximately 50 mm.

The following is a summary list of reference numerals and the corresponding structure used in the above description of the invention:

2 Gangway connection system
6 Power cable
8 Supporting part
10 Clamping part
10a Front half shell
10b Rear half shell
12 Terminal bus
14 Connection point
16 Insulator
18 Base plate
20a First feed through
20b Second feed through
22 Opening
22a Inlet opening
22b Outlet opening
24a Outer longitudinal sectional contour
24b Inner longitudinal sectional contour
26 Holding portion
28 Outlet portion
32 Winding
34 Outer surface
36 Abutment surface
38 Outside edge 40 Inside edge
K Cable longitudinal axis
L Longitudinal axis
L2 Length
M1, M2, M2' Center point
R1, R2, R3, R4, R5, R5' Radius

The invention claimed is:

1. A gangway connection system for guiding at least one power cable, the gangway connection system comprising:
   a clamping part having at least one feed through formed therein for the power cable, said feed through extending along a longitudinal axis between an inlet opening and an outlet opening and containing a longitudinal sectional profile, said longitudinal sectional profile having an inner and an outer longitudinal sectional contour, at least one of said inner and outer longitudinal sectional contours being curved at least in regions; and
   at least one of said inner and outer longitudinal sectional contours having, at least in portions, a radius of curvature corresponding to a radius of curvature of the power cable being a helical power cable.

2. The gangway connection system according to claim 1, wherein said at least one feed through is one of two feed throughs with different longitudinal sectional profiles, namely a first feed through and a second feed through, are realized for the at least one power cable.

3. The gangway connection system according to claim 1, wherein both of said inner and outer longitudinal sectional contours are curved in a same direction on a first portion and in opposite directions on a second portion.

4. The gangway connection system according to claim 1, wherein said feed through has a holding portion for fixing the power cable and a diameter, which corresponds substantially to a diameter of the power cable, on said holding portion.

5. The gangway connection system according to claim 4, wherein said holding portion is realized in the manner of a curved cylinder.

6. The gangway connection system according to claim 4, wherein said holding portion extends over at least a quarter of a length of said feed through and no more than over half of the length of said feed through.

7. A gangway connection system for guiding at least one power cable, the gangway connection system comprising:
   a clamping part having at least one feed through formed therein for the power cable, said feed through extending along a longitudinal axis between an inlet opening and an outlet opening and containing a longitudinal sectional profile, said longitudinal sectional profile having an inner and an outer longitudinal sectional contour, at least one of said inner and outer longitudinal sectional contours being curved at least in regions; and
   at least one of said inner and outer longitudinal sectional contours having, at least in portions, a radius of curvature which corresponds to a predefined minimum radius of curvature of the power cable or enables a progression of the power cable at the predefined minimum radius of curvature.

8. A gangway connection system for guiding at least one power cable, the gangway connection system comprising:
   a clamping part having at least one feed through formed therein for the power cable, said feed through extending along a longitudinal axis between an inlet opening and an outlet opening and containing a longitudinal sectional profile, said longitudinal sectional profile having an inner and an outer longitudinal sectional contour, at least one of said inner and outer longitudinal sectional contours being curved at least in regions; and
   said feed through having an outlet portion, being realized in a manner of a funnel, connects to said outlet opening and, on said outlet portion in relation thereto, said feed through having a diameter, which increases in a direction of said outlet opening.

9. The gangway connection system according to claim 8, wherein said feed through has a circular cross section consistently on said outlet portion.

10. A gangway connection system for guiding at least one power cable, the gangway connection system comprising:
    a clamping part having at least one feed through formed therein for the power cable, the power cable extending in a helical manner in a cable longitudinal direction, said clamping part having an outer surface pointing in the cable longitudinal direction with at least one abutment surface for the power cable and extending at an angle with respect to the cable longitudinal direction.

11. The gangway connection system according to claim 10, wherein said abutment face is inclined at an angle of at least 65° and no more than 85° with reference to the cable longitudinal direction.

12. The gangway connection system according to claim 10, wherein said clamping part has a height and said abutment surface extends over at least 15% of the height and no more than 50% of the height.

13. The gangway connection system according to claim 10, wherein said abutment surface is one of two abutment surfaces formed in said outer surface and are set in two opposing directions.

14. A clamping part for a gangway connection system, comprising:
    a body having at least one feed through formed therein for receiving a power cable, said feed through extending along a longitudinal axis and between an inlet opening and an outlet opening and having a longitudinal sectional profile with an inner and an outer longitudinal sectional contour, wherein at least one of said inner and outer longitudinal sectional contours is curved at least in portions, or in that the power cable extends in a helical manner in a cable longitudinal direction and said body having an outer surface pointing in the cable longitudinal direction and having at least one abutment surface for the power cable extending at an angle with respect to the cable longitudinal direction.

* * * * *